Patented Feb. 12, 1924.

1,483,515

UNITED STATES PATENT OFFICE.

JONATHAN K. LIPPEN, OF BATTLE CREEK, MICHIGAN, ASSIGNOR TO POSTUM CEREAL COMPANY, INCORPORATED, OF BATTLE CREEK, MICHIGAN, A CORPORATION OF DELAWARE.

CEREAL FLAKES AND PROCESS OF MAKING SAME.

No Drawing.   Application filed December 6, 1922.   Serial No. 605,288.

*To all whom it may concern:*

Be it known that I, JONATHAN K. LIPPEN, a citizen of the United States, and a resident of Battle Creek, Michigan, have invented new and useful Improvements in Cereal Flakes and Processes of Making Same, which invention is fully set forth in the following specification.

The present invention relates to flaked cereal food products and methods of making the same, and more particularly to cooked cereal flake products rendered laxative by the presence of bran of the cereal.

The object of the invention is to provide a product of the above kind wherein the nourishing contents of the bran cells, such as protein, sugar, fats and mineral salts, normally locked up in the cellular structure of the bran are rendered available for digestion; to preserve the vitamines present in the bran coating and adjacent layers of the endosperm of the grain in active condition in the finished product; and to associate with the bran a portion of the endosperm of the cereal berry next the bran coating in quantity sufficient to effect proper granulation of the product during the cooking and flaking and render the flaked product palatable and readily masticated.

By way of illustration, I shall describe my invention as applied to the treatment of wheat, which I preferably employ in making my cereal flakes. The wheat berry, as is well known, consists of the germ, the endosperm, or the main body of the grain, and the bran or outer envelopes of the grain. The bran envelope comprises in turn a plurality of layers, the outside layer consisting chiefly of cellulose, the innermost layer next the endosperm consisting of aleurone cells containing protein. While bran contains, locked up in its cells, nutritive materials such as albuminous substances, fats, sugar and mineral salts such as phosphates and salts of potassium these are not readily assimilated by the digestive organs which cannot successfully attack the fibrous walls of the cells in which they are contained. The bran envelope is also the carrier of those vitally active bodies designated "vitamines". The endosperm enveloped by the bran covering consists of a cell structure containing granules of starch and small granules of gluten which latter are greater in number in that part of the berry lying immediately under the bran envelope.

With the above objects in view, my invention, stated in general terms, includes cleaning the grain, toughening the bran envelope and the layers of the endosperm immediately thereunder, but without extending the toughening action below the outer portion of the endosperm; then subjecting the tempered grain to the action of breaking rolls whereby the bran envelope and a portion of endosperm adhering thereto is rendered separable by sieving from the inner portion of the endosperm and the germ, to produce a flaky product which contains bran about 65% to 70% and adhering endosperm about 30% to 35%; then subjecting the separated flaky portion to a cooking operation in the presence of moisture and at a temperature insufficient to injure the activity of the vitamines; then drying the cooked product sufficiently to reduce the content of moisture to about 16% to 18% and leave the aforementioned flaky portions in granular form; sifting out any lumps formed by cooking; then flaking the sorted granules under a pressure sufficient to rupture the cell structure of the bran envelope and render available for digestive action their contents; and finally passing the flakes through a heated zone while avoiding heating the flakes above the limiting temperature for vitamines.

As an illustrative example of my process, I first pass the wheat berries, freed from seeds and other foreign bodies, through a rotary cylinder washer preferably of the Wolf-Dawson type at a rate of 65 bushels of grain per hour while drenching with about 1000 gallons of water at about 60° F. The cylinder revolves at the rate of about 340 revolutions per minute. In this washer the dirt is loosened from the creases in the berry and preferably the grain is then passed through a second washing cylinder rotating at about 320 revolutions where the last traces of dirt are removed. As the grain comes from the second washing cylinder, it is freed from excess of moisture, aerated and then conveyed to storage tanks wherein it is allowed to "temper" for about one hour at room temperature, whereby the moisture penetrates through the bran envelope and slightly into the outer portion of the endosperm, thereby rendering said bran envelope and endosperm portion tough and pliable.

After the wheat grains have been treated in the above manner, they are passed into a scouring machine to remove what is commonly known as "bee wings," and then subjected to a milling operation by passing through "first break" rolls. These rolls are preferably of the type wherein the rolls are provided with 12 to 15 corrugations per inch, means being provided for regulating the pressure preferably at their bearings. The rolls are preferably driven at 450–550 revolutions per minute, and at a differential speed of 2½ to 3½, i. e. one roll revolves 2½ to 3½ times as fast as the companion roll. The wheat grains are thereby crushed into coarse flakes of comparatively large area consisting of the bran envelope of the berry to which is attached enough endosperm to supply the protein and starch necessary to make a flake of proper consistency and flavor. Also the inner portion of the endosperm consisting of the starchy portion of the berry has been broken away from the branny flake. The crushed product is next passed to a sieve, preferably a No. 10 mesh sieve. The flaky portion passes over the sieve and is reserved for the next step of the process, while the finer starchy portions pass through the sieve and may be used for milling into flour. This branny flake as the result of the above procedure consists substantially of 65% to 70% of bran and 30% to 35% of endosperm adhering thereto. This product which is the starting material which I employ for making my cereal flakes is believed to be itself new in this art.

To the branny product above described I preferably add salt and malt syrup to impart a desirable flavor but these may be omitted if desired. For this purpose I preferably prepare a solution of malt syrup and salt in the proportions of one hundred (100) pounds of malt syrup, twenty-one (21) pounds of salt and water to make forty-five (45) gallons. This solution is incorporated with one thousand (1000) pounds of the flaky product of bran and endosperm, and the seasoned product is transferred without the addition of further moisture to a rotary steam cooker wherein it is cooked at a temperature of about 112° C. to 115° C. for about 80 to 90 minutes. While it is believed that the vitamines are not destroyed at 120° C., yet I prefer to employ the range of temperature named as giving excellent results.

The cooked product is next subjected to a partial drying operation, preferably in a drier, such for example as in an Eureka drier, wherein the temperature is kept at about 82° to 85° C. and the moisture is reduced in the product to about 16% to 18%. After the drying operation each of the branny flakes will be found to have assumed a granular form.

From the drier the product is passed to a sieve whereby lumps which may have been formed by cooking are removed. The portion passing through the sieve is then subjected to the action of flaking rolls. These rolls are preferably smooth and held together under heavy spring tension capable, in the case of rolls 20 inches in diameter and 24 inches long, of exerting a pressure at the line of contact of approximately 30 tons. The rolls are preferably run at relatively different speeds with a view of stretching and increasing the area of the flakes. By this treatment the bran cells are ruptured, thereby setting free the nourishing content thereof. The bran tissue is at the same time broken up into minute fragments which are carried by the thin flakes of glutenous endosperm, and the flakes are rendered six to eight per cent more soluble (and hence more digestible) than is the cooked product from which they were made.

The flakes, which still retain moisture, are preferably baked in a suitable oven at a temperature not to exceed 115° C. I have obtained excellent results by passing the flakes through a heating zone the temperature of which is kept at about 176° to 194° C., while the rate of movement of the flakes is sufficient to enable evaporation of the moisture in the flakes to keep the temperature of the flakes below that destructive of vitamines, i. e. about 115° C.

Cereal flakes produced by the above process are characterized by the relative proportion of bran envelope to that of the endosperm content whereby they are rendered laxative while being palatable, the higher per cent of available soluble cell content as compared with cooked flakes before subjecting to the crushing action, the content of active vitamines in the final product and these characteristics combined with that of attractive palatability.

By the term "bran" or "bran envelope" used herein I mean the husk or enveloping coating of the grain as distinguished from the endosperm enclosed by said coating.

While I have herein specifically described my process as employed in the treatment of wheat it will readily be understood by those skilled in the art that it is equally applicable in the treatment of other grains, and some of the steps may in some cases be omitted.

What I claim is:—

1. The process of making flaked cereals consisting in cleaning the cereal grains, toughening the bran envelope thereof and a portion of the endosperm immediately below said envelope by subjecting the same to moisture, then crushing the grains to produce a flaky portion comprising said toughened bran and endosperm, separating the flaky portion from other portions of the crushed grains, incorporating with said flaky portion a solution of salt and malt syrup, steam-cooking the mass, then reducing the moisture therein to 16% to 18% water, passing the cooked product between high pressure rolls moving at different speeds thereby rupturing the bran cells and liberating their contents and disintegrating the bran into particles and reducing the toughened endosperm of said flakes into thin flaky films supporting said bran products, and finally drying said flaky films.

2. The process of making cereal flakes consisting in washing wheat grains with water, tempering the bran envelope thereof and a portion of the endosperm immediately beneath said envelope by moisture, crushing the resulting product between rolls thus producing a flaky portion of toughened bran and endosperm and a finer portion of untempered endosperm, separating said portions, incorporating with said flaky portion a solution of salt and malt syrup, steam-cooking the mixture, drying the cooked product to a content of moisture of 16% to 18% of water whereby it is left in granular form, then flaking the granules between high pressure differential rolls thereby rupturing the bran cells and liberating their contents and disintegrating the bran into particles and at the same time reducing the toughened endosperm of said flakes into thin films carrying said bran products, and finally drying the same.

3. The process of making cereal flakes which consists in moistening the bran envelope and the endosperm layers immediately thereunder, crushing the moistened cereal, thereby forming the moistened portion into flaky bodies while more finely dividing the interior portion of the endosperm, separating the flaky bodies from the finer portions, mixing the flaky portions with a salt and malt syrup solution, steam-cooking the mixture, then partially drying the same and flaking between high pressure differential rolls, and drying the flakes.

4. The process of making cereal flakes which consists in subjecting the cereal to moisture sufficient to dampen the bran envelope and the endosperm layers immediately thereunder, separating said dampened portion from the undampened portion, treating the former with a saline malt syrup solution, steam-cooking the same, and then flaking and drying the product.

5. The process of making a cereal flake which consists in washing wheat grains, removing all except a film of moisture therefrom, allowing the same to stand for approximately one hour to permit the moisture to penetrate the bran envelope and endosperm layers immediately thereunder without penetrating the interior portions of the endosperm, passing the grains between crushing rolls, whereby the bran and adjacent endosperm portion is formed into flaky particles and the interior of the endosperm is broken into fine particles, separating out the flaky particles, mixing said flaky particles with a saline malt syrup solution, steam-cooking the mixture, partially drying the cooked product, and then flaking and drying the same.

6. In the process of making flaked cereals consisting in cleaning the grain, tempering the bran envelope and a portion of the endosperm immediately below said envelope with water, crushing the product between rolls to produce a flaky portion consisting of bran 65% to 70% and toughened endosperm 30% to 35% and untempered endosperm granules and separating the flaky portion from the granular portion.

7. The process of making cereal flakes which consists in subjecting the cereal to moisture sufficient to dampen the bran envelope and the endosperm layers immediately thereunder, separating said dampened portion from the undampened portion, adding water thereto, cooking the same and then flaking and drying the product.

8. The process of making a cereal flake which consists in washing wheat grains, removing all except a film of moisture therefrom, allowing the same to stand for approximately one hour to permit the moisture to penetrate the bran envelope and endosperm layers immediately thereunder without penetrating the interior portions of the endosperm, passing the grains between crushing rolls, whereby the bran and adjacent endosperm portion is formed into flaky particles and the interior of the endosperm is broken into fine particles, separating out the flaky particles, mixing said flaky particles with water, cooking the mixture, partially drying the cooked product, and then flaking and drying the same.

9. A food product consisting of cooked wheat flakes, said flakes consisting of thin pieces of cooked endosperm rich in gluten supporting minute fragments of bran and containing the contents of the ruptured bran cells.

10. A food produced as defined in claim 9, wherein the ratio of bran is approximately 65% to 35% of endosperm.

In testimony whereof I have signed this specification.

JONATHAN K. LIPPEN.